United States Patent [19]

Serviere

[11] Patent Number: 5,343,505
[45] Date of Patent: Aug. 30, 1994

[54] DEVICE FOR THE RECOVERY OF A MOLTEN CORE OF A NUCLEAR REACTOR

[75] Inventor: Georges Serviere, Lissieu, France

[73] Assignee: Electricite de France Service National, France

[21] Appl. No.: 64,816

[22] Filed: May 19, 1993

[30] Foreign Application Priority Data

May 21, 1992 [FR] France .................. 92 06208

[51] Int. Cl.⁵ .......................................... G21C 9/016
[52] U.S. Cl. ................................................. 376/280
[58] Field of Search .............. 376/280; 976/DIG. 143

[56] References Cited

U.S. PATENT DOCUMENTS 3,607,630 9/1971 West et al. ........................... 376/280
3,930,939 1/1976 Bittermann et al. ................. 376/280
4,464,333 8/1984 Wohlsen ............................... 376/280

FOREIGN PATENT DOCUMENTS 2035089 3/1971 Fed. Rep. of Germany .
2193233 2/1974 France .
2030347 4/1980 United Kingdom .

*Primary Examiner*—Daniel D. Wasil
*Attorney, Agent, or Firm*—Pearne, Gordon, McCoy & Granger

[57] ABSTRACT

Device for the recovery of a molten core of a nuclear reactor essentially constituted by partitions (4) for subdividing a volume located below the core into narrow empty volumes (5), into which the molten material will slowly flow, and cooling channels (6) for solidifying said material. The vaporization of the coolant advantageously brings about its automatic replenishment under the effect of the hydrostatic pressure of a raised source.

11 Claims, 3 Drawing Sheets

5,343,505

DEVICE FOR THE RECOVERY OF A MOLTEN CORE OF A NUCLEAR REACTOR

DESCRIPTION

The invention relates to a recovery device for a nuclear reactor molten core.

Certain accidents in the recent past have demonstrated that the molten core dropping onto the foundation or floor was able to have such an action thereon as to penetrate the same, so that the material might then spread in the neighbouring soil with difficulty forecastable consequences and only limited possibilities of reacting thereto. This is why a recovery device located under the core is proposed, which is designed in such a way as to vigorously cool the core when it has melted as a result of an accident and has dropped, while preventing the advance thereof towards the floor. In its most general form the device comprises vertical partitions defining separate volumes, certain of these volumes being empty, whereas the other volumes are filled with coolant. The latter volumes are surmounted by a refractory material layer.

Therefore the molten material mass flows into the empty volumes, but the latter are sufficiently numerous and narrow to decelerate said flow, whose viscosity is also rapidly reduced by the coolant surrounding the empty volumes. The molten material is in heat exchange relationship with the coolant, from which it is only separated by the partitions, which conduct heat and are normally relatively thin. Therefore it is to be expected that the dropping of the molten core will be greatly slowed down and will be forced to solidify before reaching the actual floor.

It is advantageous for the partitions to be parallel, so that the coolant-filled volumes form channels in which the coolant can effectively flow in a substantially horizontal direction. Under these conditions, the channels can extend between a slightly raised coolant source and a vaporized coolant outlet. Therefore the coolant replenishment is automatic and is due to the hydrostatic pressure as soon as the vaporization reduces the coolant height on one side of the channels.

However, the channels can be separated from the source by a valve or any other isolating device, but a valve or automatic opening device is provided when the coolant is heated.

It is also advantageous that the empty and the coolant-filled volumes are surmounted by a continuous heat absorption material layer, which surmounts the refractory material layer so as to reduce the mechanical and thermal shocks if an accident occurs. This avoids the risk of the destruction of the refractory material layer and the partitions by a core having an excessive temperature. It is pointed out in this connection that only the destruction of large portions of partitions could modify the process, but small size destructions during normal operation of the device would not have dangerous consequences, because the material which would penetrate the coolant-filled channels would be subject to an even more vigorous cooling and would therefore rapidly solidify.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
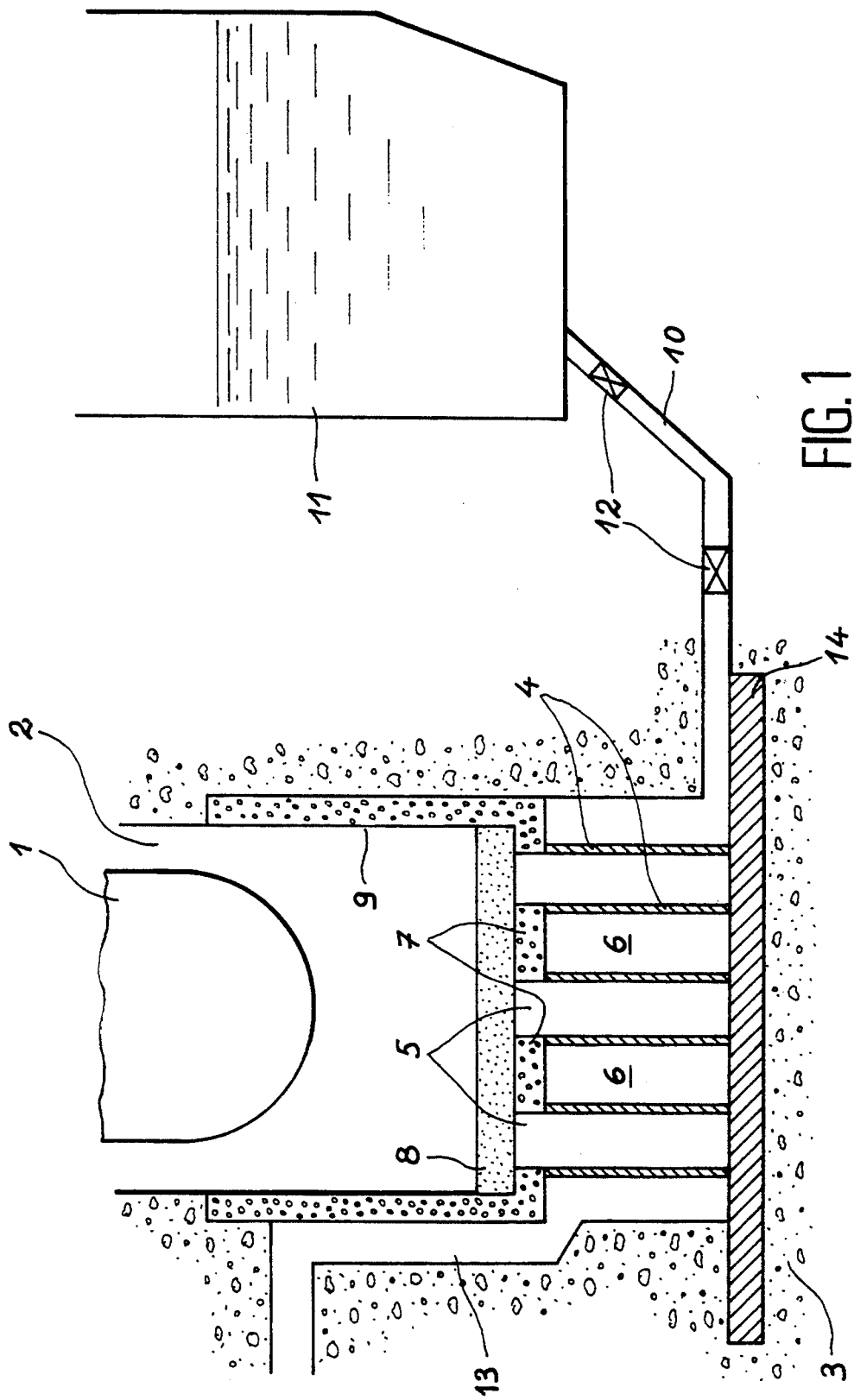
FIG. 1 a general view of the device in accordance with the present invention, the channels being visible in cross-sectional form.

A nuclear reactor core is located in a vessel 1 placed in a concrete walled well or shaft 2. The floor or foundation 3 extends beneath the well 2 and below the remainder of the power station. The recovery device is included in the floor 3 and comprises partitions 4 normally constituted by parallel steel plates defining narrow, elongated, empty volumes 5, which alternate with coolant channels 6. The coolant is normally water. Each of the coolant channels 6 is surmounted by a refractory concrete layer 7 and a continuous silica concrete layer 8 surmounts the refractory concrete layers 7, as well as the empty volumes 5. The silica concrete layer 8 can sufficiently deaden the shock of the falling molten material, while partly absorbing the heat thereof, so that the remainder of the recovery device is not exposed to excessive temperatures.

As illustrated in FIG. 1, a refractory concrete enclosure 9 is placed at the bottom lateral sides of the well 2 and is in contact with the ends of the refractory concrete layers 7. It makes it possible to confine the molten mass preventing it from attacking the less resistant lateral walls of the well 2.

The coolant channels 6 are connected by at least one pipe 10 common to a coolant source 11, which can be of a random nature such as a watercourse, an artificial lake or a sump of the power station. In the latter case it is conceivable that the sump would be empty during normal operation and would only be filled during an accident during which case the pipe 10 is open. However, it is more reliable to use permanently filled sumps and if then the water level is too high, valves 12 or other sealing devices can close the pipe 10 during normal periods. It is then advantageous for the valves 12 or said devices to open automatically, i.e. are controlled by a device sensitive to the temperature rise in the area of the coolant channels 6 or provided with fusible parts, which disintegrate when the neighbouring area is heated.

An outlet 13, formed by at least one pipe opposite to the preceding pipe 10, makes it possible to freely give off the vapour produced by the heating process into the atmosphere.

The operation of the recovery device in the case of an accident firstly involves the destruction of the continuous silica concrete layer 8 and then the molten material penetrates the empty volumes 5 without being able to attack the refractory concrete layers 7. This viscous molten material is then decelerated by the partitions 4 and only descends slowly, particularly as it is rapidly exposed to the cooling process, which significantly increases the molten material viscosity. The partitions 4 may be locally pierced by the very hot material, but this will not lead to any significant disturbance, because the material which comes into contact with the coolant will be exposed to an even faster cooling operation, which will solidify the material and transform it into a plug obstructing the opening. Therefore it is pointless to protect the partitions 4 by covering them with refractory material, which would significantly slow down the cooling process.

The evacuation of the vapour permits a permanent and automatic replenishment of the cold coolant from the source 11 through the coolant channels 6, in order to compensate for the unbalance of the hydrostatic pressures. Circulation is purely natural and no pump or similar device is used. The aim is to solidify the core material when it is only occupying part of the empty volumes 5. However, if necessary, cooling can continue until the empty volumes 5 are completely filled. A refractory concrete plate 14 is located below the empty volumes 5 and the coolant channels 6 so as to provide a final protection for the floor 3 before it can be attacked.

Figure 2:
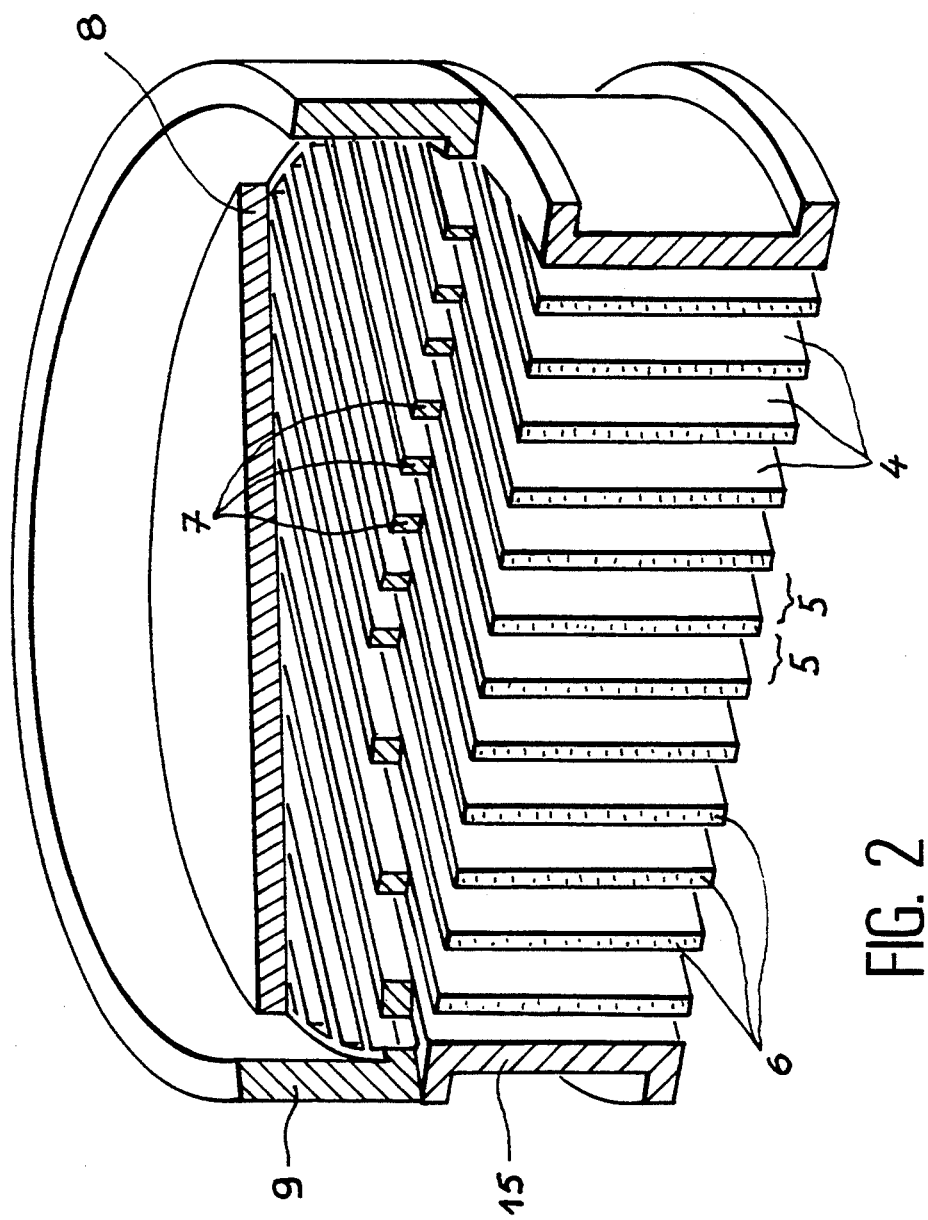
FIG. 2 a partial perspective view of the device in perspective according to the present invention.
Figure 3:
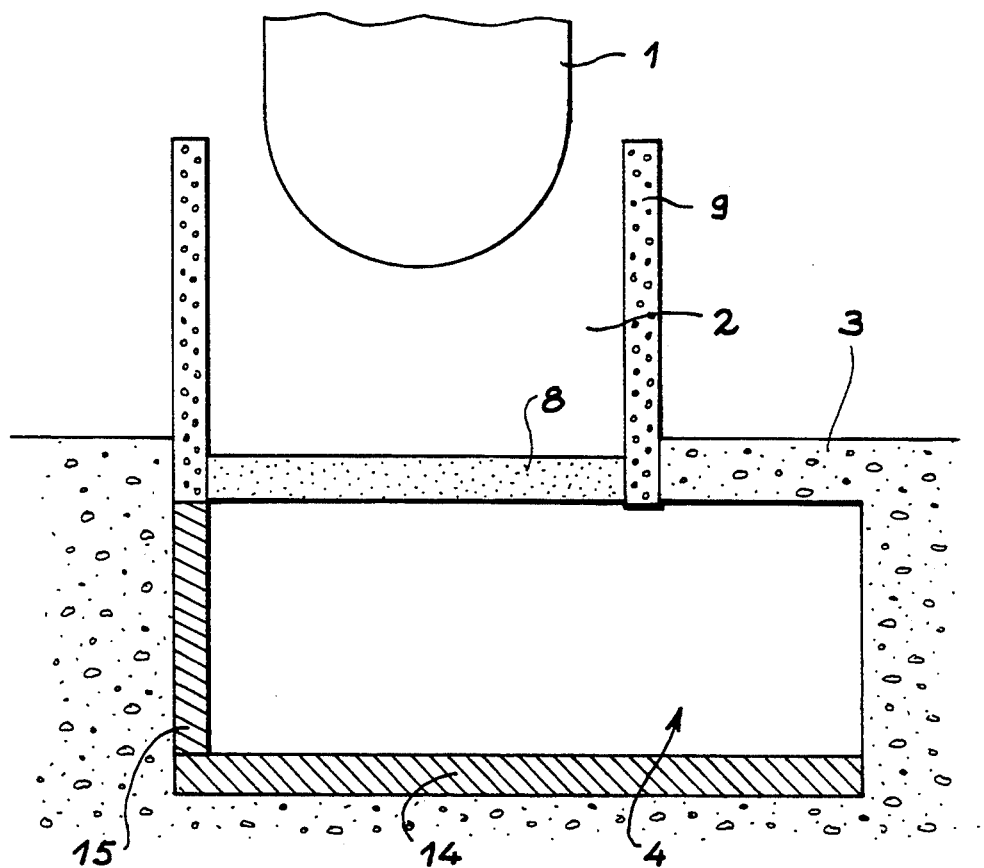
FIGS. 3 and 4 a second embodiment of the invention in vertical section, the channels being viewed longitudinally, and in plan view, respectively.

The rectilinear partitions 4 defining the channel-like empty volumes 5 have the advantage of permitting a significant cooling flow and a large heat absorption fluid volume. Moreover, the recovery device can be elongated in accordance with the slightly different construction shown in FIGS. 3 and 4. The refractory concrete enclosure 9 is supported by a foundation 15, which is also visible in FIG. 2, but which is in this case not continuous and instead has an interruption 16, whose width substantially corresponds to the internal diameter of the refractory concrete enclosure 9. The partitions 4 and the empty volumes 5, as well as the coolant channels 6 which they define, extend below the interruption 16 and out of the foundation 15 and the vertical of the well 2.

Figure 4:
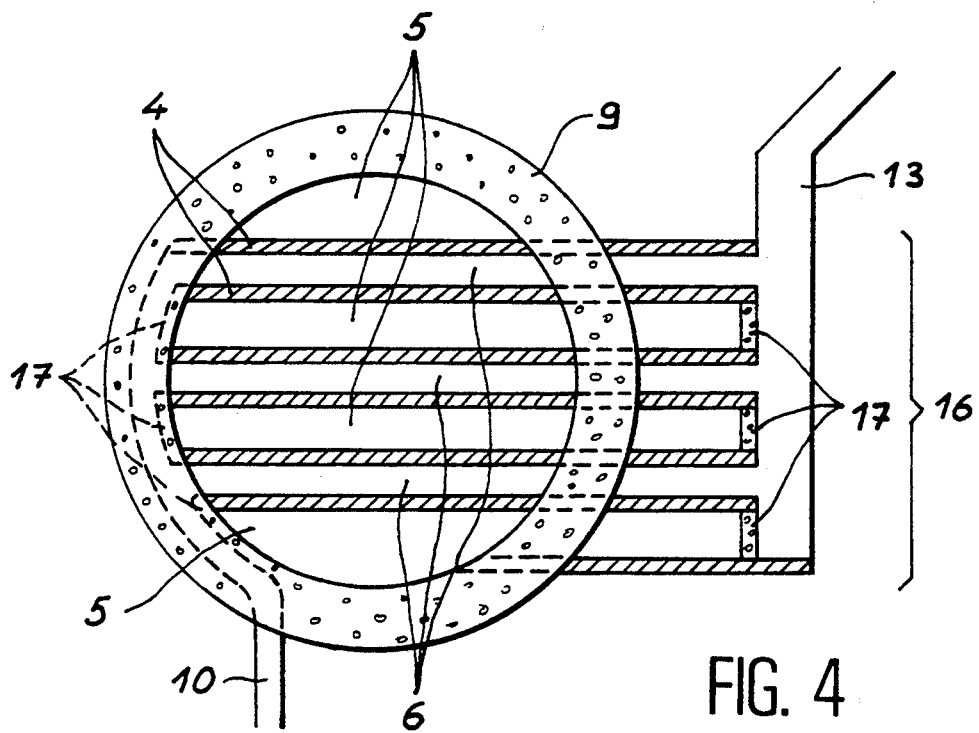

This arrangement enables the molten core to spread to a greater extent and to be cooled more rapidly. The refractory concrete enclosure 9 is subject to a sufficiently small overhang to be permitted. FIG. 4 shows how the pipe 10 and the outlet 13 are connected to the ends of the coolant channels 6. The empty volumes 5 are isolated from the pipe 10 and the outlet 13 by the walls 17.

I claim:

1. Device for the recovery of a molten nuclear reactor core, comprising beneath the core (1) vertical partitions (4) defining separate volumes (5,6), certain of the volumes (5) being empty and the other of the volumes (6) being filled with coolant, the coolant-filled volumes being surmounted by a refractory material layer (7), wherein the partitions (4) are generally parallel, the coolant-filled volumes (6) forming channels in which the coolant circulates substantially horizontally.

2. Device for the recovery of a molten core according to claim 1, wherein the partitions (4) are generally straight.

3. Device for the recovery of a molten core according to claim 1, wherein the partitions (4) extend horizontally beyond a vertical well (2) in which the core is located.

4. Device for the recovery of a molten core according to claim 1, wherein the partitions (4) are composed of metal.

5. Device for the recovery of a molten core according to claim 1, wherein the channels (6) extend between a raised coolant source (10) and a vaporized coolant outlet (13).

6. Device for the recovery of a molten core according to claim 5, wherein the coolant source (10) is separated from the channels (6) by a valve (12) when the coolant is heated.

7. Device for the recovery of a molten core according to claim 1, wherein the empty and coolant-filled volumes (5, 6) are surmounted by a continuous heat absorption material layer (8) which surmounts the refractory material layer.

8. Device for the recovery of a molten core according to claim 7, wherein the heat absorption material is silica concrete.

9. Device for the recovery of a molten core according to claim 1, comprising a refractory material enclosure (9) which surrounds an area located above the empty and coolant-filled volumes (5, 6).

10. Device for the recovery of a molten core according to claim 1, wherein the refractory material is a refractory concrete.

11. Device for the recovery of a molten core according to claim 5, wherein the coolant source (10) is separated from the channels (6) by an automatically opening device when the coolant is heated.

* * * * *